(12) United States Patent
Fu et al.

(10) Patent No.: US 11,897,979 B2
(45) Date of Patent: Feb. 13, 2024

(54) POLYACRYLONITRILE (PAN) AND PREPARATION METHOD AND USE THEREOF

(71) Applicant: Changchun University of Technology, Changchun (CN)

(72) Inventors: Zhongyu Fu, Changchun (CN); Huijie Yan, Changchun (CN); Huixuan Zhang, Changchun (CN)

(73) Assignee: Changchun University of Technology, Changchun (CN)

( * ) Notice: Subject to any disclaimer, the term of this patent is extended or adjusted under 35 U.S.C. 154(b) by 56 days.

(21) Appl. No.: 17/811,301

(22) Filed: Jul. 7, 2022

(65) Prior Publication Data

US 2023/0027650 A1 Jan. 26, 2023

(30) Foreign Application Priority Data

Jul. 8, 2021 (CN) .......................... 202110772138.3

(51) Int. Cl.
*C08F 20/44* (2006.01)
*C08F 220/44* (2006.01)
*C08F 2/38* (2006.01)
*C08F 2/44* (2006.01)

(52) U.S. Cl.
CPC ................ *C08F 20/44* (2013.01); *C08F 2/44* (2013.01)

(58) Field of Classification Search
CPC ........ C08F 20/44; C08F 220/44; C08F 20/48; C08F 220/48; C08F 2/38
See application file for complete search history.

(56) References Cited

U.S. PATENT DOCUMENTS

2019/0100856 A1* 4/2019 Knoop ..................... D01D 5/08

* cited by examiner

*Primary Examiner* — Catherine S Branch
(74) *Attorney, Agent, or Firm* — AVEK IP, LLC

(57) ABSTRACT

Some embodiments of the disclosure provides polyacrylonitrile (PAN) and a preparation method and use thereof. The method includes the following steps. Mixing raw materials for polymerization to obtain a suspension comprising the PAN. The raw materials include an acrylonitrile monomer, a first auxiliary monomer, a second auxiliary monomer, a polymerization medium, an initiator, a chain transfer agent, and a settling agent. Removing unreacted monomers and unreacted polymerization medium in the suspension to obtain the PAN. After subsequent removal of monomers, removal of a polymerization medium, washing, and drying, a PAN powder is obtained. In some embodiments, the preparation method of the PAN has a wide adjustable range of a PAN copolymerization composition, a low viscosity of a polymerization system, a high concentration of a polymerized monomer, and a strong anti-scaling ability.

8 Claims, 2 Drawing Sheets

POLYACRYLONITRILE (PAN) AND PREPARATION METHOD AND USE THEREOF

CROSS REFERENCE TO RELATED APPLICATIONS

This patent application claims the benefit and priority of Chinese Patent Application No. 202110772138.3, filed on Jul. 8, 2021, the disclosure of which is incorporated by reference herein in its entirety.

FIELD OF THE DISCLOSURE

The disclosure relates generally to the field of polymer synthesis and processing. More specifically, the disclosure relates to polyacrylonitrile (PAN) and a preparation method and use thereof.

BACKGROUND

Polyacrylonitrile (PAN) is widely used in the fields of synthetic resins, synthetic fibers, and carbon-based materials due to a unique molecular structure, desirable copolymerization operability, abundant raw material source, and low production cost.

PAN-based carbon fibers prepared from PAN fibers have become high-performance fibers with the fastest development, the highest output, the largest variety, and the widest range of use due to a simple production process, low production cost, and excellent mechanical properties. The PAN has been widely used in aerospace, defense technology, construction, sporting goods, and medical equipment and other fields.

At present, the PAN in industry is mainly prepared by two methods: homogeneous solution polymerization and aqueous precipitation polymerization. The homogeneous solution polymerization in preparing PAN has a long polymerization period, high viscosity of a polymerization system, and difficult mass and heat transfer in a later stage of polymerization, resulting in poor process operability during the polymerization.

Although having a polymerization system with low viscosity, the aqueous precipitation polymerization also has many shortcomings. To improve the spinnability and thermo-oxidative stabilization of PAN, modified PAN is generally prepared by copolymerizing vinyl acid monomers and vinyl ester monomers with acrylonitrile through the aqueous precipitation polymerization. However, there are differences in reactivity of acrylonitrile with the vinyl acid monomers and vinyl ester monomers, and differences in solubility of the three polymerized monomers in water, leading to serious inhomogeneity in the copolymerization sequence of polymerization products. Moreover, when a monomer concentration exceeds a certain amount, solid large particles are formed in an aqueous precipitation polymerization product due to the initiation of monomer droplets. This may seriously affect the molecular weight distribution of the polymerization product, solubility, spinnability of a spinning solution, and operability of subsequent pre-oxidation and carbonization, which is not conducive to improvement of the mechanical properties of PAN fibers and carbon fibers. Another technical difficulty in the aqueous precipitation polymerization is that the polymerization product during the polymerization adheres to the wall of a polymerization vessel, which is called "scaling". Due to differences between a polymerization environment at a scaled place and an interior of the kettle, the molecular weight, copolymerization composition, gel content and other material characteristic parameters of a product at the scaled place are extremely different from those of normal products in the kettle. The scaling leads to a decrease in a heat transfer capacity of the polymerization kettle, and further causes a decrease in a polymerization stability. Therefore, the scaling during aqueous precipitation polymerization leads to frequent downtime for maintenance, seriously reducing a production efficiency and product quality. Moreover, the aqueous precipitation polymerization product has an extremely high water content, and water has a vaporization heat of 2,660 kJ/kg, causing a slow drying rate of the product and an extremely high energy consumption, which seriously increases the production cost.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the present disclosure provides a preparation method of PAN. The PAN is obtained by polymerization of the following raw materials in parts by weight:

| | |
|---|---|
| an acrylonitrile monomer | 5 parts to 70 parts, |
| a first auxiliary monomer | 0 parts to 20 parts, |
| a second auxiliary monomer | 0.025 parts to 10 parts, |
| a polymerization medium | 20 parts to 90 parts, |
| an initiator | 0.001 parts to 4 parts, |
| a chain transfer agent | 0 parts to 5 parts, and |
| a settling agent | 0 parts to 30 parts. |

The first auxiliary monomer is at least one item selected from the group consisting of a vinyl ester monomer, vinyl imidazole, 4-acryloyl morpholine, and styrene.

The second auxiliary monomer is at least one item selected from the group consisting of a vinyl acid monomer, a vinylamine monomer, a vinylamide monomer, and an ammonium salt of a vinyl acid.

The polymerization medium is at least one item selected from the group consisting of dimethyl carbonate, diethyl carbonate, dibutyl carbonate, methyl hydrogen carbonate, ethyl methyl carbonate, propyl methyl carbonate, and butyl methyl carbonate.

The preparation method of the PAN includes the following steps. Mixing the raw materials to conduct polymerization to obtain a suspension containing the PAN. Removing unreacted monomers and the polymerization medium in the suspension to obtain the PAN.

Optionally, the vinyl ester monomer is at least one item selected from the group consisting of methyl acrylate, methyl methacrylate, vinyl acetate, propylene acetate, allyl acetate, ethyl acrylate, ethyl methacrylate, 2-ethylhexyl methacrylate, 2-hydroxyethyl methacrylate, 2-hydroxypropyl methacrylate, cyclohexyl methacrylate, isobutyl acrylate, n-butyl acrylate, n-butyl methacrylate, isobutyl methacrylate, dimethyl maleate, dimethyl itaconate, monomethyl itaconate, monoethyl itaconate, mono-n-propyl itaconate, monoisopropyl itaconate, mono-n-butyl itaconate, monoisobutyl itaconate, ethyl 2-(dimethylamino) acrylate, and propyl 3-(dimethylamino) acrylate.

Optionally, the vinyl acid monomer is at least one item selected from the group consisting of acrylic acid, methacrylic acid, itaconic acid, methylfumaric acid, 2-butenoic acid, maleic acid, methylmaleic acid, 2-acrylamido-2-methylpropanesulfonic acid, and methylallylsulfonic acid.

Optionally, the vinylamine monomer is at least one item selected from the group consisting of dimethylamino ethyl methacrylate, 2-ethylamino ethyl methacrylate, and N,N-dimethylallylamine.

Optionally, the vinylamide monomer is at least one item selected from the group consisting of acrylamide, methacrylamide, N-hydroxymethyl acrylamide, N,N-dimethylacrylamide, amine methylallyl sulfonate, and amine styrene sulfonate.

Optionally, the ammonium salt of a vinyl acid includes ammonium itaconate.

Optionally, the initiator is an azo initiator and/or a peroxy initiator.

Optionally, the azo initiator is at least one item selected from the group consisting of azobisisobutyronitrile, 2,2'-azodi(2-methylbutyronitrile), 2,2'-azobis-(2,4-dimethylvaleronitrile), dimethyl 2,2'-azobis(2-methylpropionate), 2,2'-azobis[2-methylpropionamidine]dihydrochloride, 2,2'-azobis[2-(2-imidazolin-2-yl)propane]dihydrochloride, 4,4'-azobis(4-cyanovaleric acid), 2,2'-[azobis(1-methylethylidene)]bis[4,5-dihydro-1H-imidazole], and 2,2'-azobis[2-methyl-N-(2-hydroxyethyl)propionamide]; and the peroxy initiator is at least one item selected from the group consisting of hydrogen peroxide, benzoyl peroxide, dodecanoyl peroxide, cumene hydroperoxide, tert-butyl hydroperoxide, diisopropyl peroxydicarbonate, ammonium persulfate, and potassium persulfate.

Optionally, the settling agent is at least one item selected from the group consisting of water, ethanol, methanol, pentanol, n-butanol, isobutanol, cyclohexanol, benzyl alcohol, ethylene glycol, glycerol, chloroform, formic acid, and acetic acid.

Optionally, the polymerization is conducted at 30° C. to 100° C.

Optionally, the polymerization is conducted for 0.5 h to 24 h.

Optionally, the polymerization is conducted under a protective atmosphere.

Optionally, the present disclosure provides PAN prepared by the disclosed preparation method. The PAN has a number average molecular weight of $4 \times 10^4$ g/mol to $5 \times 10^5$ g/mol and a molecular weight distribution index of 2.0 to 3.5.

Optionally, present disclosure provides use of the PAN in preparation of a PAN fiber, a PAN-based carbon fiber, or PAN-based carbon nanoparticles.

In some embodiments, the present disclosure provides a preparation method of PAN. The PAN is obtained by polymerization of the following raw materials in parts by weight: an acrylonitrile monomer 5 parts to 70 parts, a first auxiliary monomer 0 parts to 20 parts, a second auxiliary monomer 0.025 parts to 10 parts, a polymerization medium 20 parts to 90 parts, an initiator 0.001 parts to 4 parts, a chain transfer agent 0 parts to 5 parts, and a settling agent 0 parts to 30 parts. The first auxiliary monomer is at least one item selected from the group consisting of a vinyl ester monomer, vinyl imidazole, 4-acryloyl morpholine, and styrene. The second auxiliary monomer is at least one item selected from the group consisting of a vinyl acid monomer, a vinylamine monomer, a vinylamide monomer, and an ammonium salt of a vinyl acid. The polymerization medium is at least one item selected from the group consisting of dimethyl carbonate, diethyl carbonate, dibutyl carbonate, methyl hydrogen carbonate, ethyl methyl carbonate, propyl methyl carbonate, and butyl methyl carbonate.

In other embodiments, PAN is prepared by a polymerization medium. All raw materials are dissolved in the polymerization medium, which is beneficial to achieve equal consumption of a copolymerization composition. Therefore, the prepared PAN is uniform, and has a narrow molecular weight distribution and a molecular weight distribution index of 2.0 to 3.5. The polymerization medium cannot dissolve PAN, and the granular PAN is dispersed in the polymerization medium. Therefore, compared with solution polymerization, the polymerization system of the present disclosure has an extremely low viscosity and an intrinsic viscosity of 1.92 dL/g to 6.59 dL/g (25° C., dimethylformamide). Meanwhile, the polymerization medium has a weak solvation effect on PAN, thereby reducing the occurrence of scaling during the polymerization. In addition, the low viscosity of the polymerization system is also conducive to mass and heat transfer. The polymerization medium has low heat of vaporization, achieving rapid drying, reducing a production cost and improving production efficiency.

In the present disclosure, the polymerization has no strict limitation on an initiation system, which may be flexibly adjusted according to subsequent application requirements.

In the present disclosure, the PAN has a particle size ranging from tens of nanometers to hundreds of nanometers, realizing rapid dissolution when preparing a spinning solution and effectively reducing the appearance of gels. The PAN has a wide adjustable range of copolymerization composition, an arbitrarily adjusted number average molecular weight of $4 \times 10^4$ g/mol to $5 \times 10^5$ g/mol and a low molecular weight distribution index of 2.0 to 3.5. These factors are conducive to preparation of a spinning solution with desirable spinnability, and the prepared PAN fibers and PAN-based carbon fibers have high mechanical properties and excellent process stability.

In the present disclosure, there is no surfactant involved in a preparation process of the PAN, and the polymerization product has a high purity. The polymerization product may be used to prepare carbon nanoparticles, PAN fibers, and PAN-based carbon fibers with a uniform particle size.

BRIEF DESCRIPTION OF THE DRAWINGS

Illustrative embodiments of the present disclosure are described in detail below with reference to the figures.

DETAILED DESCRIPTION

Figure 1:
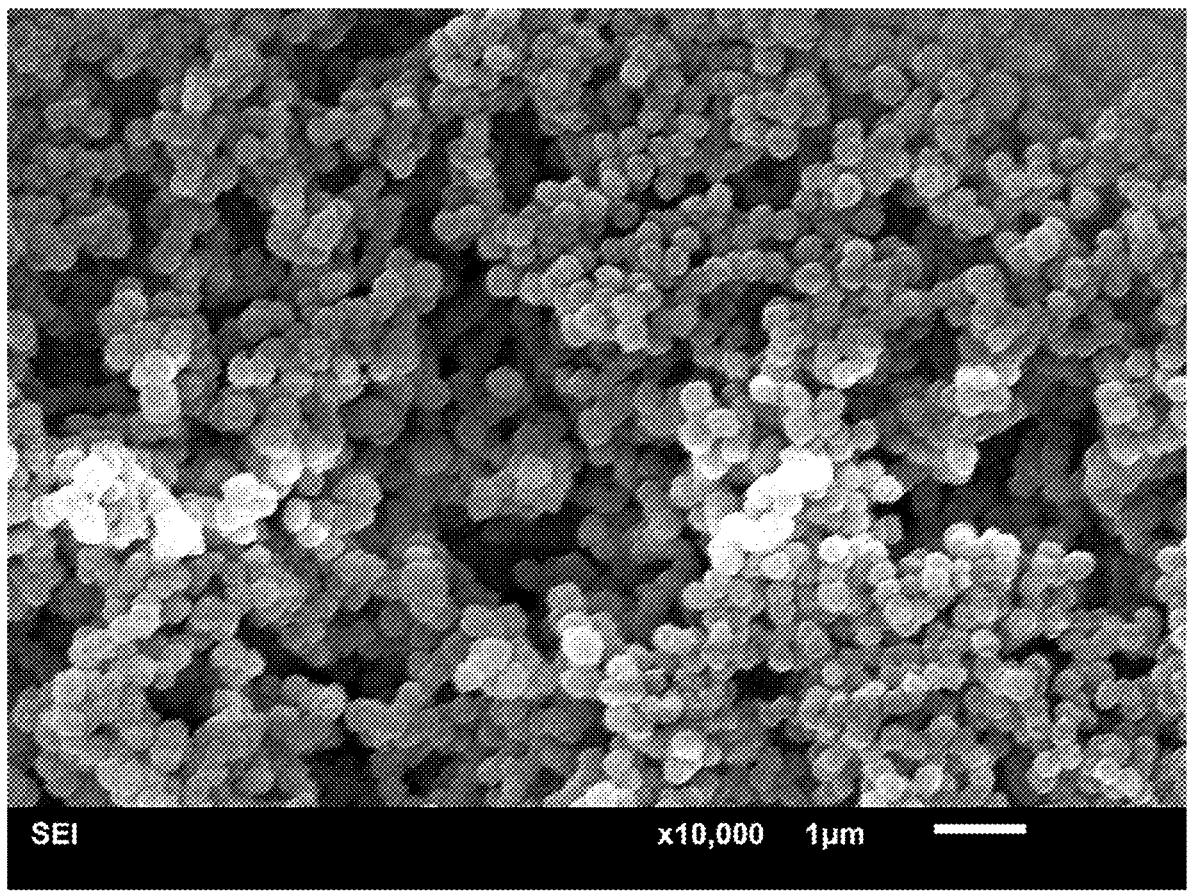
FIG. 1 shows a scanning electron microscope (SEM) image of PAN prepared in Example 24.

The following describes some non-limiting embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

The present disclosure provides a preparation method of PAN, where the PAN is obtained by polymerization of the following raw materials in parts by weight:

| | |
|---|---|
| an acrylonitrile monomer | 5 parts to 70 parts; |
| a first auxiliary monomer | 0 parts to 20 parts; |
| a second auxiliary monomer | 0.025 parts to 10 parts; |
| a polymerization medium | 20 parts to 90 parts; |
| an initiator | 0.001 parts to 4 parts; |
| a chain transfer agent | 0 parts to 5 parts; and |
| a settling agent | 0 parts to 30 parts; | where, the first auxiliary monomer is one or more selected from the group consisting of a vinyl ester monomer, vinyl imidazole, 4-acryloyl morpholine, and styrene;

the second auxiliary monomer is one or more selected from the group consisting of a vinyl acid monomer, a vinylamine monomer, a vinylamide monomer, and an ammonium salt of a vinyl acid; and the polymerization medium is one or more selected from the group consisting of dimethyl carbonate, diethyl carbonate, dibutyl carbonate, methyl hydrogen carbonate, ethyl methyl carbonate, propyl methyl carbonate, and butyl methyl carbonate; and the preparation method of the PAN includes the following steps:

mixing the raw materials to conduct polymerization to obtain a suspension containing the PAN; and removing unreacted monomers and the polymerization medium in the suspension to obtain the PAN.

In the present disclosure, unless otherwise specified, all raw materials used are commercially available products well known to those skilled in the art.

In the present disclosure, in parts by weight, the preparation raw materials of PAN include 5 parts to 70 parts, preferably 15 parts to 60 parts, more preferably 20 parts to 50 parts of an acrylonitrile monomer. Acrylonitrile is used as a polymerized monomer as well as a poor solvent of PAN, which is conducive to the precipitation of PAN, thereby reducing the viscosity of a PAN suspension.

In the present disclosure, based on parts by weight of the acrylonitrile, the preparation raw materials of PAN further include 0 parts to 20 parts, preferably 0.05 parts to 10 parts, more preferably 0.1 parts to 7 parts, and furthermore preferably 0.15 parts to 4 parts of a first auxiliary monomer. The first auxiliary monomer is one or more selected from the group consisting of a vinyl ester monomer, vinyl imidazole, 4-acryloyl morpholine, and styrene, preferably the vinyl ester monomer. When the first auxiliary monomer includes two or more of the above specific substances, there is no special limitation on a mass ratio of the above specific substances, and any ratio may be used. The vinyl ester monomer is preferably one or more selected from the group consisting of methyl acrylate, methyl methacrylate, vinyl acetate, propylene acetate, allyl acetate, ethyl acrylate, ethyl methacrylate, 2-ethylhexyl methacrylate, 2-hydroxyethyl methacrylate, 2-hydroxypropyl methacrylate, cyclohexyl methacrylate, isobutyl acrylate, n-butyl acrylate, n-butyl methacrylate, isobutyl methacrylate, dimethyl maleate, dimethyl itaconate, monomethyl itaconate, monoethyl itaconate, mono-n-propyl itaconate, monoisopropyl itaconate, mono-n-butyl itaconate, mono-isobutyl itaconate, ethyl 2-(dimethylamino) acrylate, and propyl 3-(dimethylamino) acrylate, more preferably one or more selected from the group consisting of the methyl acrylate, the methyl methacrylate, the vinyl acetate, the isobutyl acrylate, and the monomethyl itaconate, and most preferably the methyl acrylate or the dimethyl itaconate. When the vinyl ester monomer includes two or more of the above specific substances, there is no special limitation on a mass ratio of the above specific substances, and any ratio may be used.

In the present disclosure, the first monomer may improve the solubility of PAN and a rheological stability of a PAN spinning solution. This is beneficial to high draft during the fiber forming and diffusion of oxygen into the PAN fibers or PAN particles in a pre-oxidation stage, thereby achieving fine denier and high strength of the PAN fibers and carbon fibers.

In the present disclosure, based on parts by weight of the acrylonitrile, the preparation raw materials of PAN further include 0.025 parts to 10 parts, preferably 0.05 parts to 3.5 parts, and more preferably 0.075 parts to 3 parts of a second auxiliary monomer. The second auxiliary monomer is one or more selected from the group consisting of a vinyl acid monomer, a vinylamine monomer, a vinylamide monomer, and an ammonium salt of a vinyl acid, preferably the vinyl acid monomer, the vinylamide monomer, and the ammonium salt of a vinyl acid. When the second auxiliary monomer includes a plurality of the above substances, there is no special limitation on a ratio of each substance. The vinyl acid monomer is preferably one or more selected from the group consisting of acrylic acid, methacrylic acid, itaconic acid, methylfumaric acid, 2-butenoic acid, maleic acid, methylmaleic acid, 2-acrylamido-2-methylpropanesulfonic acid, and methylallylsulfonic acid, more preferably one or more selected from the group consisting of the acrylic acid, the methacrylic acid, the itaconic acid, the 2-acrylamido-2-methylpropanesulfonic acid, and the methylallylsulfonic acid. The vinylamide monomer is preferably one or more selected from the group consisting of acrylamide, methacrylamide, N-hydroxymethyl acrylamide, N,N-dimethylacrylamide, amine methylallyl sulfonate, and amine styrene sulfonate, more preferably one or more selected from the group consisting of the acrylamide, the methacrylamide, the amine methylallyl sulfonate, and the amine styrene sulfonate. The vinylamine monomer is preferably one or more selected from the group consisting of dimethylamino ethyl methacrylate, 2-ethylamino ethyl methacrylate, and N,N-dimethylallylamine. The ammonium salt of a vinyl acid includes preferably ammonium itaconate.

In the present disclosure, the second auxiliary monomer is beneficial to alleviate exothermic concentration of the PAN fibers during pre-oxidation, and reduce an initial exothermic temperature of the pre-oxidation. This is beneficial to carbon formation of the acrylonitrile and improve the mechanical properties and carbon yield of the carbon fibers.

In the present disclosure, based on parts by weight of the acrylonitrile, the preparation raw materials of PAN further include 20 parts to 90 parts, preferably 30 parts to 85 parts, more preferably 40 parts to 80 parts of a polymerization medium. The polymerization medium is one or more selected from the group consisting of dimethyl carbonate, diethyl carbonate, dibutyl carbonate, methyl hydrogen carbonate, ethyl methyl carbonate, propyl methyl carbonate, and butyl methyl carbonate, preferably one or more selected from the group consisting of the dimethyl carbonate, the diethyl carbonate, the methyl hydrogen carbonate, the ethyl methyl carbonate, and the propyl methyl carbonate, more preferably one or more selected from the group consisting of the dimethyl carbonate, the diethyl carbonate, the methyl hydrogen carbonate, and the ethyl methyl carbonate. When the polymerization medium includes a variety of the above substances, there is no special requirement for a proportion of each polymerization medium, and any proportion may be used.

In the present disclosure, PAN is prepared by a polymerization medium; all raw materials are dissolved in the polymerization medium, which is beneficial to achieve equal consumption of a copolymerization composition; therefore, the prepared PAN is uniform, and has a narrow molecular weight distribution and a molecular weight distribution index of 2.0 to 3.5. The polymerization medium cannot dissolve PAN, and the granular PAN is dispersed in the polymerization medium; therefore, compared with solution polymerization, the polymerization system of the present disclosure has an extremely low viscosity. Meanwhile, the polymerization medium has a weak solvation effect on PAN, thereby reducing the occurrence of scaling during the polymerization. In addition, the low viscosity of the polymerization system is also conducive to mass and heat transfer. The polymerization medium has low heat of vaporization, achieving rapid drying, reducing a production cost and improving production efficiency.

In the present disclosure, based on parts by weight of the acrylonitrile, the preparation raw materials of PAN further include 0.001 parts to 4 parts, preferably 0.004 parts to 3 parts, and more preferably 0.01 parts to 1 part of an initiator. The initiator is preferably an azo initiator and/or a peroxy initiator; the azo initiator is preferably one or more selected from the group consisting of azobisisobutyronitrile, 2,2'-azodi(2-methylbutyronitrile), 2,2'-azobis-(2,4-dimethylvaleronitrile), dimethyl 2,2'-azobis(2-methylpropionate), 2,2'-azobis[2-methylpropionamidine]dihydrochloride, 2,2'-azobis[2-(2-imidazolin-2-yl)propane]dihydrochloride, 4,4'-azobis(4-cyanovaleric acid), 2,2'-[azobis(1-methylethylidene)]bis[4,5-dihydro-1H-imidazole], and 2,2'-azobis[2-methyl-N-(2-hydroxyethyl)propionamide], more preferably one or more selected from the group consisting of the azobisisobutyronitrile, the 2,2'-azodi(2-methylbutyronitrile), and the 2,2'-azobis-(2,4-dimethylvaleronitrile). The peroxy initiator is preferably one or more selected from the group consisting of hydrogen peroxide, benzoyl peroxide, dodecanoyl peroxide, cumene hydroperoxide, tert-butyl hydroperoxide, diisopropyl peroxydicarbonate, ammonium persulfate, and potassium persulfate, more preferably one or more of the tert-butyl hydroperoxide, the diisopropyl peroxydicarbonate, the ammonium persulfate, and the potassium persulfate, and most preferably the diisopropyl peroxydicarbonate, the ammonium persulfate, and the potassium persulfate.

In the present disclosure, based on parts by weight of the acrylonitrile, the preparation raw materials of PAN further include 0 parts to 5 parts, preferably 0 parts to 2.5 parts, more preferably 0 parts to 1 parts of a chain transfer agent. There is no special requirement for a type of the chain transfer agent, including but not limited to dodecyl mercaptan and isopropanol.

In the present disclosure, based on parts by weight of the acrylonitrile, the preparation raw materials of PAN further include 0 parts to 30 parts, preferably 0 parts to 20 parts, more preferably 0 parts to 15 parts of a settling agent. The settling agent is preferably one or more selected from the group consisting of water, ethanol, methanol, pentanol, n-butanol, isobutanol, cyclohexanol, benzyl alcohol, ethylene glycol, glycerol, chloroform, formic acid, and acetic acid, more preferably water, the ethanol, the methanol, the pentanol, and the n-butanol, and furthermore preferably water, the ethanol, and the methanol.

In the present disclosure, a preparation method of the PAN includes the following steps:

mixing the raw materials to conduct polymerization to obtain a suspension containing the PAN; and
removing unreacted monomers and the polymerization medium in the suspension to obtain the PAN.

In the present disclosure, there is no special requirement for a mixing method, as long as each raw material may be mixed uniformly. The mixing includes preferably: uniformly stirring the acrylonitrile, the first auxiliary monomer, the second auxiliary monomer, and a part of the polymerization medium under nitrogen protection to obtain a primary mixed raw material; under nitrogen protection, mixing the initiator and the remaining polymerization medium to obtain an initiator solution; and under nitrogen protection, mixing the primary mixed raw material and the initiator solution under stirring to obtain a mixed raw material. There is no special requirement for a stirring rate during the mixing, and stirring rates well-known in the art may be used. There is no special requirement for a ratio of the part of the polymerization medium and the remaining polymerization medium, as long as each raw material may be dissolved.

In the present disclosure, the polymerization is conducted at preferably 30° C. to 100° C., more preferably 40° C. to 90° C., and furthermore preferably 50° C. to 80° C. for preferably 0.5 h to 24 h, more preferably 3 h to 20 h, and further more preferably 6 h to 15 h; by controlling a polymerization time, a total mass conversion rate of the acrylonitrile monomer, the first auxiliary monomer, and the second auxiliary monomer may reach 15% to 95%. The polymerization is conducted preferably under a protective atmosphere, more preferably under a nitrogen atmosphere. The polymerization is preferably conducted under stirring conditions; there is no special requirement for a stirring rate during the polymerization, and stirring rates well known in the art may be used.

In the present disclosure, the unreacted monomers and the polymerization medium in the suspension are removed to obtain the PAN.

In the present disclosure, there is no special requirement for a specific method of removing the unreacted monomers and the polymerization medium, as long as the above two may be removed; for example, the removing is conducted by a single-screw devolatilization extruder or a twin-screw devolatilization extruder. After removing the unreacted monomers and the polymerization medium, an obtained solid is preferably washed and dried to obtain powdery PAN. There is no special requirement for a washing and drying process, and washing and drying processes well known in the art may be used.

The present disclosure further provides PAN prepared by the preparation method, where the PAN has a number average molecular weight of $4 \times 10^4$ g/mol to $5 \times 10^5$ g/mol and a molecular weight distribution index of 2.0 to 3.5. In the present disclosure, the PAN has a particle size ranging from tens of nanometers to hundreds of nanometers, with a uniform particle size, realizing rapid dissolution when preparing a spinning solution and effectively reducing the appearance of gels. The PAN has a wide adjustable range of copolymerization composition, an arbitrarily adjusted number average molecular weight of $4 \times 10^4$ g/mol to $5 \times 10^5$ g/mol and a low molecular weight distribution index of 2.0 to 3.5. These factors are conducive to preparation of a spinning solution with desirable spinnability, and the prepared PAN fibers and PAN-based carbon fibers have high mechanical properties and excellent process stability.

The present disclosure provides use of the PAN in preparation of a PAN fiber, a PAN-based carbon fiber, or PAN-based carbon nanoparticles.

In the present disclosure, when the PAN is used to prepare a PAN fiber, a preparation method of the PAN fiber includes preferably the following steps:

dissolving the PAN in a solvent to obtain a PAN spinning stock solution; where the PAN in the spinning stock solution has a mass concentration of 10% to 40%; and conducting wet spinning or dry jet wet spinning on the spinning stock solution to obtain the PAN fiber.

In the present disclosure, there is no special requirement for a type of the solvent, and solvents known in the art for preparing PAN fibers may be used; in an example, the solvent is N,N-dimethylacetamide. There is no special requirement for a spinning process, and spinning processes well known in the art may be used.

In the present disclosure, when the PAN is used to prepare a PAN-based carbon fiber, a preparation method of the PAN-based carbon fiber includes preferably the following steps:

preparing a PAN fiber; and
subjecting the PAN fiber to pre-oxidation under air conditions and carbonization under inert gas conditions sequentially to obtain the PAN-based carbon fiber.

In the present disclosure, a method for preparing the PAN fiber is the same as the above-mentioned scheme, and will not be repeated here.

In the present disclosure, there is no special requirement for conditions of the pre-oxidation and the carbonization, and pre-oxidation and carbonization processes well known in the art may be used.

In the present disclosure, when the PAN is used to prepare PAN-based carbon nanoparticles, a preparation method of the PAN-based carbon nanoparticles includes preferably the following steps:

conducting pre-oxidation on the PAN in a mixed gas including nitrogen and oxygen, and conducting carbonization on obtained oxidized particles in an inert atmosphere to obtain the PAN-based carbon nanoparticles.

In the present disclosure, the pre-oxidation is conducted at preferably 180° C. to 300° C., more preferably 200° C. to 290° C. for preferably 5 min to 180 min, more preferably 10 min to 120 min. The mixed gas has preferably 20% to 23%, more preferably 20.2% to 22% of the oxygen by volume fraction. The mixed gas has an absolute pressure of preferably 0.05 MPa to 1 MPa, more preferably 0.08 MPa to 0.8 MPa.

In the present disclosure, there is no special requirement for a carbonization process, and carbonization processes well-known in the art may be used. In an example, the carbonization includes sequentially-conducted low-temperature carbonization and high-temperature carbonization; the low-temperature carbonization includes eight temperature zones of 450° C., 500° C., 550° C., 600° C., 650° C., 780° C., 800° C., and 900° C. sequentially, with a total residence time of 12 min and a residence time in each temperature zone of 1.5 min; and the high-temperature carbonization includes three temperature zones of 1,100° C., 1,200° C., and 1,300° C. sequentially, with a total residence time of 3 min and a residence time in each temperature zone of 1 min.

The PAN and the preparation method and the use thereof provided by the present disclosure will be described in detail below in conjunction with examples, but should not be construed as limiting the scope of the disclosure.

Example 1

24.2 parts of acrylonitrile, 0.25 parts of itaconic acid, 0.5 parts of methyl acrylate, and 70 parts of dimethyl carbonate were stirred for 5 min under nitrogen protection at 160 r/min, to obtain a primary mixed raw material; under nitrogen protection, 0.05 parts of azobisisobutyronitrile and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 10 h under the protection of nitrogen at 160 r/min, 60° C., and a relative pressure of 0 MPa (a conversion rate of a total mass of a polymerized monomer was 61%), to obtain a PAN suspension with a solid content of 15.25%; after removing the monomers, removing the solvent, washing and drying, a PAN powder was obtained, with a particle size of 90 nm to 120 nm, a number average molecular weight of PAN at $12.1 \times 10^4$ g/mol, a molecular weight distribution of 2.6, and an intrinsic viscosity of 2.74 dL/g (25° C., dimethylformamide).

Taking the PAN of Example 1 as a raw material, using N,N-dimethylacetamide as a solvent, and a spinning stock solution with a mass concentration of the PAN at 23% was prepared for dry jet wet spinning, to prepare a PAN fiber. A specific method included: the spinning stock solution was spun through a spinneret with a pore size of 120 μm and an aspect ratio of 3, to enter a 5 mm air layer, and then enter a coagulation bath at 25° C. (the N,N-dimethylacetamide and water at a mass ratio of 55:45) for 300% positive drafting; a tow coagulated by the coagulation bath was successively passed through a first-stage low-concentration coagulation bath (the N,N-dimethylacetamide and water at a mass ratio of 45:55, at 65° C., a residence time of 10 sec, and 40% positive stretching), a second-stage low-concentration coagulation bath (the N,N-dimethylacetamide and water at a mass ratio of 40:60, at 70° C., a residence time of 7 sec, and 60% positive stretching), a third-stage low-concentration coagulation bath (the N,N-dimethylacetamide and water at a mass ratio of 35:65, at 75° C., a residence time of 6 sec, and 20% positive stretching), and a fourth-stage low-concentration coagulation bath (the N,N-dimethylacetamide and water at a mass ratio of 30:70, at 75° C., a residence time of 5 sec, and 10% positive stretching); a filament obtained through the low-concentration coagulation bath was successively subjected to first-level water washing (75° C., a residence time of 10 sec, 0% positive drafting), and second-level water washing (80° C., residence time of 8 sec, 10% positive drafting), a third-level water washing (85° C., residence time of 8 sec, 10% positive draft), four-level water washing (95° C., residence time of 8 sec, 10% positive draft), first-stage boiling water drafting (95° C., residence time of 8 sec, 20% positive drafting), second-stage boiling water drafting (98° C., residence time of 8 s, 10% positive drafting), third-stage boiling water drafting (98° C., residence time of 8 s, 10% positive drafting), oiling (an oiling agent was a composite modified silicone oil, at 35° C., an oiling amount was 1.5 wt. % of the PAN fiber), and steam drafting (155° C., 300% positive draft); a product was dried by a double roller dryer (including 10 pairs of double rollers, at 95° C., 95° C., 105° C., 110° C., 115° C., 120° C., 135° C., 140° C., 150° C., 160° C., with drafting rates of 0%, 0%, 5%, 5%, 5%, 5%, 5%, 5%, 5%, 5% in sequence), and subjected to drafting and heat setting (including 2 pairs of double rollers, at 90° C. and 40° C., with drafting rates of −3% and 0% in sequence), to obtain the PAN fiber with a tensile strength of 8.9 cN/dtex.

The PAN fiber was sequentially pre-oxidized at normal pressure (absolute pressure of 0.1 MPa), at 230° C., 235° C., 245° C., 252° C., 255° C., 260° C., 266° C., and 270° C., with drafting rates of 4%, 3%, 1%, 0%, 0%, −1%, −2%, −2% in sequence, for a total time of 45 min; a heating medium for pre-oxidation was a mixed gas of nitrogen and oxygen at a volume ratio of 79.91:20.09; a pre-oxidized PAN fiber was sequentially subjected to low-temperature carbonization (at 450° C., 500° C., 550° C., 600° C., 650° C., 780° C., 800° C., and 900° C. in eight temperature zones in sequence, with a drafting rate of 0%, a total residence time of 12 min, and a residence time in each temperature zone of 1.5 min) and high-temperature carbonization (at 1,100° C., 1,200° C., and 1,300° C. in three temperature zones in sequence, with a drafting rate of 0%, a total residence time of 3 min, and a residence time in each temperature zone of 1 min), to obtain a PAN-based carbon fiber with a tensile strength of 6.1 GPa and a tensile modulus of 300 GPa.

Example 2

29.04 parts of acrylonitrile, 0.3 parts of itaconic acid, 0.6 parts of methyl acrylate, and 65 parts of dimethyl carbonate were stirred for 5 min under nitrogen protection at 160 r/min, to obtain a primary mixed raw material; under nitrogen protection, 0.06 parts of azobisisobutyronitrile and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 10 h under the protection of nitrogen at 160 r/min, 60° C., and a relative pressure of 0 MPa (a conversion rate of a total mass of a polymerized monomer was 68%), to obtain a PAN suspension with a solid content of 20.4%; after removing the monomers, removing the solvent, washing and drying, a PAN powder was obtained, with a particle size of 100 nm to 140 nm, a number average molecular weight of PAN at $14.5 \times 10^4$ g/mol, a molecular weight distribution of 2.4, and an intrinsic viscosity of 3.18 dL/g (25° C., dimethylformamide).

Taking the PAN of Example 2 as a raw material, using N,N-dimethylacetamide as a solvent, and a spinning stock solution with a mass concentration of the PAN at 20% was prepared for wet spinning, to prepare a PAN fiber. A specific method included: the spinning stock solution was spun through a spinneret with a pore size of 70 μm and an aspect ratio of 2, to enter a high-concentration coagulation bath at 65° C. (the N,N-dimethylacetamide and water at a mass ratio of 65:35) for −30% drafting; a tow coagulated by the high-concentration coagulation bath was successively passed through a first-stage low-concentration coagulation bath (the N,N-dimethylacetamide and water at a mass ratio of 55:45, at 65° C., a residence time of 15 sec, and 30% positive stretching), a second-stage low-concentration coagulation bath (the N,N-dimethylacetamide and water at a mass ratio of 45:55, at 70° C., a residence time of 10 sec, and 60% positive stretching), a third-stage low-concentration coagulation bath (the N,N-dimethylacetamide and water at a mass ratio of 30:70, at 75° C., a residence time of 8 sec, and 40% positive stretching), and a fourth-stage low-concentration coagulation bath (the N,N-dimethylacetamide and water at a mass ratio of 20:80, at 75° C., a residence time of 8 sec, and 30% positive stretching); a filament obtained through the low-concentration coagulation bath was successively subjected to first-level water washing (75° C., a residence time of 10 sec, 0% positive drafting), and second-level water washing (80° C., residence time of 8 sec, 10% positive drafting), a third-level water washing (85° C., residence time of 8 sec, 10% positive draft), four-level water washing (95° C., residence time of 8 sec, 10% positive draft), first-stage boiling water drafting (95° C., residence time of 8 sec, 20% positive drafting), second-stage boiling water drafting (98° C., residence time of 8 s, 10% positive drafting), third-stage boiling water drafting (98° C., residence time of 8 s, 10% positive drafting), oiling (an oiling agent was an amino-modified silicone oil, at 35° C., an oiling amount was 1.5 wt. % of the PAN fiber), and steam drafting (145° C., 350% positive draft); a product was dried by a double roller dryer (including 10 pairs of double rollers, at 95° C., 95° C., 105° C., 110° C., 115° C., 120° C., 135° C., 140° C., 150° C., 160° C., with drafting rates of 0%, 0%, 5%, 5%, 5%, 5%, 5%, 5%, 5%, 5% in sequence), and subjected to drafting and heat setting (including 2 pairs of double rollers, at 90° C. and 40° C., with drafting rates of −3% and 0% in sequence), to obtain the PAN fiber. The PAN had a tensile strength of 8.3 cN/dtex.

The PAN fiber was sequentially pre-oxidized at normal pressure (absolute pressure of 0.1 MPa), at 230° C., 235° C., 245° C., 252° C., 255° C., 260° C., 266° C., and 270° C., with drafting rates of 4%, 3%, 1%, 0%, 0%, −1%, −2%, −2% in sequence, for a total time of 45 min; a heating medium for pre-oxidation was a mixed gas of nitrogen and oxygen at a volume ratio of 79.91:20.09; a pre-oxidized PAN fiber was sequentially subjected to low-temperature carbonization (at 450° C., 500° C., 550° C., 600° C., 650° C., 780° C., 800° C., and 900° C. in eight temperature zones in sequence, with a drafting rate of 0%, a total residence time of 12 min, and a residence time in each temperature zone of 1.5 min) and high-temperature carbonization (at 1,100° C., 1,200° C., and 1,300° C. in three temperature zones in sequence, with a drafting rate of 0%, a total residence time of 3 min, and a residence time in each temperature zone of 1 min), to obtain a PAN-based carbon fiber with a tensile strength of 5.8 GPa and a tensile modulus of 295 GPa.

Example 3

33.88 parts of acrylonitrile, 0.35 parts of itaconic acid, 0.7 parts of methyl acrylate, and 60 parts of dimethyl carbonate were stirred for 5 min under nitrogen protection at 160 r/min, to obtain a primary mixed raw material; under nitrogen protection, 0.07 parts of azobisisobutyronitrile and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 6 h under the protection of nitrogen at 160 r/min, 60° C., and a relative pressure of 0 MPa (a conversion rate of a total mass of a polymerized monomer was 75%), to obtain a PAN suspension with a solid content of 26.25%; after removing the monomers, removing the solvent, washing and drying, a PAN powder was obtained, with a particle size of 70 nm to 130 nm, a number average molecular weight of PAN at $16.9 \times 10^4$ g/mol, a molecular weight distribution of 2.7, and an intrinsic viscosity of 3.78 dL/g (25° C., dimethylformamide).

Taking the PAN of Example 3 as a raw material, and a PAN fiber with a tensile strength of 9.9 cN/dtex was prepared by dry jet wet spinning. The PAN fiber was pre-oxidized and carbonized to obtain a PAN-based carbon fiber with a tensile strength of 6.8 GPa and a tensile modulus of 330 GPa. In this example, the specific preparation conditions of the PAN fiber and PAN-based carbon fiber were the same as those in Example 1.

Example 4

38.72 parts of acrylonitrile, 0.4 parts of itaconic acid, 0.8 parts of methyl acrylate, and 55 parts of dimethyl carbonate were stirred for 5 min under nitrogen protection at 160 r/min, to obtain a primary mixed raw material; under nitrogen protection, 0.08 parts of azobisisobutyronitrile and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 6 h under the protection of nitrogen at 160 r/min, 65° C., and a relative pressure of 0 MPa (a conversion rate of a total mass of a polymerized monomer was 70%), to obtain a PAN suspension with a solid content of 28%; after removing the monomers, removing the solvent, washing and drying, a PAN powder was obtained, with a particle size of 100 nm to 140 nm, a number average molecular weight of PAN at $17.8 \times 10^4$ g/mol, a molecular weight distribution of 3.1, and an intrinsic viscosity of 4.39 dL/g (25° C., dimethylformamide).

Taking the PAN of Example 4 as a raw material, and a PAN fiber with a tensile strength of 10.2 cN/dtex was prepared by traditional wet spinning. The PAN fiber was pre-oxidized and carbonized to obtain a PAN-based carbon fiber with a tensile strength of 6.9 GPa and a tensile modulus of 332 GPa. In this example, during the preparation of PAN fiber and PAN-based carbon fiber, the PAN spinning stock solution had a mass concentration of 18%, and the other conditions were the same as those in Example 2.

Example 5

24.19 parts of acrylonitrile, 0.25 parts of itaconic acid, 0.5 parts of methyl acrylate, and 70 parts of dimethyl carbonate were stirred for 5 min under nitrogen protection at 160 r/min, to obtain a primary mixed raw material; under nitrogen protection, 0.06 parts of azobisisobutyronitrile and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 10 h under the protection of nitrogen at 160 r/min, 65° C., and a relative pressure of 0 MPa (a conversion rate of a total mass of a polymerized monomer was 60%), to obtain a PAN suspension with a solid content of 15%; after removing the monomers, removing the solvent, washing and drying, a PAN powder was obtained, with a particle size of 100 nm to 200 nm, a number average molecular weight of PAN at $9.5 \times 10^4$ g/mol, a molecular weight distribution of 2.6, and an intrinsic viscosity of 2.38 dL/g (25° C., dimethylformamide).

Taking the PAN of Example 5 as a raw material, and a PAN fiber with a tensile strength of 7.3 cN/dtex was prepared by traditional wet spinning. The PAN fiber was pre-oxidized and carbonized to obtain a PAN-based carbon fiber with a tensile strength of 4.9 GPa and a tensile modulus of 295 GPa. In this example, the specific preparation conditions of the PAN fiber and PAN-based carbon fiber were the same as those in Example 2.

Example 6

29.04 parts of acrylonitrile, 0.3 parts of itaconic acid, 0.6 parts of methyl acrylate, and 65 parts of dimethyl carbonate were stirred for 5 min under nitrogen protection at 160 r/min, to obtain a primary mixed raw material; under nitrogen protection, 0.06 parts of azobisisobutyronitrile and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 12 h under the protection of nitrogen at 160 r/min, 60° C., and a relative pressure of 0 MPa (a conversion rate of a total mass of a polymerized monomer was 80%), to obtain a PAN suspension with a solid content of 24%; after removing the monomers, removing the solvent, washing and drying, a PAN powder was obtained, with a particle size of 120 nm to 150 nm, a number average molecular weight of PAN at $9.8 \times 10^4$ g/mol, a molecular weight distribution of 3.1, and an intrinsic viscosity of 2.61 dL/g (25° C., dimethylformamide).

Taking the PAN of Example 6 as a raw material, and a PAN fiber with a tensile strength of 8.9 cN/dtex was prepared by traditional wet spinning. The PAN fiber was pre-oxidized and carbonized to obtain a PAN-based carbon fiber with a tensile strength of 5.1 GPa and a tensile modulus of 298 GPa. In this example, the specific preparation conditions of the PAN fiber and PAN-based carbon fiber were the same as those in Example 2.

Example 7

29.02 parts of acrylonitrile, 0.3 parts of itaconic acid, 0.6 parts of methyl acrylate, and 65 parts of dimethyl carbonate were stirred for 5 min under nitrogen protection at 160 r/min, to obtain a primary mixed raw material; under nitrogen protection, 0.08 parts of azobisisobutyronitrile and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 14 h under the protection of nitrogen at 160 r/min, 68° C., and a relative pressure of 0 MPa (a conversion rate of a total mass of a polymerized monomer was 90%), to obtain a PAN suspension with a solid content of 27%; after removing the monomers, removing the solvent, washing and drying, a PAN powder was obtained, with a particle size of 200 nm to 300 nm, a number average molecular weight of PAN at $11.2 \times 10^4$ g/mol, a molecular weight distribution of 2.9, and an intrinsic viscosity of 3.06 dL/g (25° C., dimethylformamide).

Taking the PAN of Example 7 as a raw material, and a PAN fiber with a tensile strength of 9.1 cN/dtex was prepared by traditional wet spinning. The PAN fiber was pre-oxidized and carbonized to obtain a PAN-based carbon fiber with a tensile strength of 5.4 GPa and a tensile modulus of 302 GPa. In this example, the specific preparation conditions of the PAN fiber and PAN-based carbon fiber were the same as those in Example 2.

Example 8

29.01 parts of acrylonitrile, 0.3 parts of itaconic acid, 0.6 parts of methyl acrylate, and 65 parts of dimethyl carbonate were stirred for 5 min under nitrogen protection at 160 r/min, to obtain a primary mixed raw material; under nitrogen protection, 0.09 parts of azobisisobutyronitrile and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 12 h under the protection of nitrogen at 160 r/min, 65° C., and a relative pressure of 0 MPa (a conversion rate of a total mass of a polymerized monomer was 85%), to obtain a PAN suspension with a solid content of 25.5%; after removing the monomers, removing the solvent, washing and drying, a PAN powder was obtained, with a particle size of 150 nm to 220 nm, a number average molecular weight of PAN at $12.9\times10^4$ g/mol, a molecular weight distribution of 2.7, and an intrinsic viscosity of 3.14 dL/g (25° C., dimethylformamide).

Taking the PAN of Example 8 as a raw material, and a PAN fiber with a tensile strength of 9.3 cN/dtex was prepared by traditional wet spinning. The PAN fiber was pre-oxidized and carbonized to obtain a PAN-based carbon fiber with a tensile strength of 5.6 GPa and a tensile modulus of 297 GPa. In this example, the specific preparation conditions of the PAN fiber and PAN-based carbon fiber were the same as those in Example 2.

Example 9

28.72 parts of acrylonitrile, 0.6 parts of itaconic acid, 0.6 parts of methyl acrylate, and 65 parts of dimethyl carbonate were stirred for 5 min under nitrogen protection at 160 r/min, to obtain a primary mixed raw material; under nitrogen protection, 0.08 parts of azobisisobutyronitrile and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 15 h under the protection of nitrogen at 160 r/min, 65° C., and a relative pressure of 0 MPa (a conversion rate of a total mass of a polymerized monomer was 82%), to obtain a PAN suspension with a solid content of 24.6%; after removing the monomers, removing the solvent, washing and drying, a PAN powder was obtained, with a particle size of 150 nm to 220 nm, a number average molecular weight of PAN at $7.2\times10^4$ g/mol, a molecular weight distribution of 3.2, and an intrinsic viscosity of 2.12 dL/g (25° C., dimethylformamide).

Taking the PAN of Example 9 as a raw material, and a PAN fiber with a tensile strength of 8.0 cN/dtex was prepared by traditional wet spinning. The PAN fiber was pre-oxidized and carbonized to obtain a PAN-based carbon fiber with a tensile strength of 4.9 GPa and a tensile modulus of 295 GPa. In this example, the PAN in spinning stock solution had a mass concentration of 21%, and the preparation conditions of the PAN fiber and PAN-based carbon fiber were the same as those in Example 2.

Example 10

28.42 parts of acrylonitrile, 0.6 parts of itaconic acid, 0.9 parts of methyl acrylate, and 65 parts of dimethyl carbonate were stirred for 5 min under nitrogen protection at 160 r/min, to obtain a primary mixed raw material; under nitrogen protection, 0.15 parts of azobisisobutyronitrile and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 18 h under the protection of nitrogen at 160 r/min, 65° C., and a relative pressure of 0 MPa (a conversion rate of a total mass of a polymerized monomer was 94%), to obtain a PAN suspension with a solid content of 28.2%; after removing the monomers, removing the solvent, washing and drying, a PAN powder was obtained, with a particle size of 130 nm to 180 nm, a number average molecular weight of PAN at $6.6\times10^4$ g/mol, a molecular weight distribution of 2.9, and an intrinsic viscosity of 2.03 dL/g (25° C., dimethylformamide).

Taking the PAN of Example 10 as a raw material, and a PAN fiber with a tensile strength of 7.8 cN/dtex was prepared by traditional wet spinning. The PAN fiber was pre-oxidized and carbonized to obtain a PAN-based carbon fiber with a tensile strength of 4.9 GPa and a tensile modulus of 291 GPa. In this example, the PAN in spinning stock solution had a mass concentration of 22%, and the other preparation conditions of the PAN fiber and PAN-based carbon fiber were the same as those in Example 2.

Example 11

33.87 parts of acrylonitrile, 0.35 parts of itaconic acid, 0.7 parts of methyl acrylate, and 60 parts of dimethyl carbonate were stirred for 5 min under nitrogen protection at 160 r/min, to obtain a primary mixed raw material; under nitrogen protection, 0.08 parts of 2,2'-azobis-(2,4-dimethylvaleronitrile) and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 10 h under the protection of nitrogen at 160 r/min, 60° C., and a relative pressure of 0 MPa (a conversion rate of a total mass of a polymerized monomer was 90%), to obtain a PAN suspension with a solid content of 31.5%; after removing the monomers, removing the solvent, washing and drying, a PAN powder was obtained, with a particle size of 110 nm to 200 nm, a number average molecular weight of PAN at $17.3\times10^4$ g/mol, a molecular weight distribution of 3.3, and an intrinsic viscosity of 4.08 dL/g (25° C., dimethylformamide).

Taking the PAN of Example 11 as a raw material, and a PAN fiber with a tensile strength of 10.3 cN/dtex was prepared by traditional wet spinning. The PAN fiber was pre-oxidized and carbonized to obtain a PAN-based carbon fiber with a tensile strength of 6.1 GPa and a tensile modulus of 305 GPa. In this example, the PAN in spinning stock solution had a mass concentration of 19%, and the other preparation conditions of the PAN fiber and PAN-based carbon fiber were the same as those in Example 2.

Example 12

33.86 parts of acrylonitrile, 0.35 parts of itaconic acid, 0.7 parts of methyl acrylate, and 60 parts of dimethyl carbonate were stirred for 5 min under nitrogen protection at 160 r/min, to obtain a primary mixed raw material; under nitrogen protection, 0.09 parts of 2,2'-azodi(2-methylbutyronitrile) and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 13 h under the protection of nitrogen at 160 r/min, 60° C., and a relative pressure of 0 MPa (a conversion rate of a total mass of a polymerized monomer was 88%), to obtain a PAN suspension with a solid content of 30.8%; after removing the monomers, removing the solvent, washing and drying, a PAN powder was obtained, with a particle size of 120 nm to 200 nm, a number average molecular weight of PAN at $16.1 \times 10^4$ g/mol, a molecular weight distribution of 2.9, and an intrinsic viscosity of 3.89 dL/g (25° C., dimethylformamide).

Taking the PAN of Example 12 as a raw material, and a PAN fiber with a tensile strength of 9.1 cN/dtex was prepared by traditional wet spinning. The PAN fiber was pre-oxidized and carbonized to obtain a PAN-based carbon fiber with a tensile strength of 5.8 GPa and a tensile modulus of 301 GPa. In this example, the PAN in spinning stock solution had a mass concentration of 19%, and the other preparation conditions of the PAN fiber and PAN-based carbon fiber were the same as those in Example 2.

Example 13

33.86 parts of acrylonitrile, 0.7 parts of methyl acrylate, and 60 parts of dimethyl carbonate were stirred for 5 min under nitrogen protection at 160 r/min, to obtain a primary mixed raw material; under nitrogen protection, 0.1 parts of 2,2'-azodi(2-methylbutyronitrile) and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 13 h under the protection of nitrogen at 160 r/min, 60° C., and a relative pressure of 0 MPa (a conversion rate of a total mass of a polymerized monomer was 90%), to obtain a PAN suspension with a solid content of 31.5%; after removing the monomers, removing the solvent, washing and drying, a PAN powder was obtained, with a number average molecular weight of PAN at $17.3 \times 10^4$ g/mol, a molecular weight distribution of 3.3, and an intrinsic viscosity of 4.19 dL/g (25° C., dimethylformamide).

Taking the PAN of Example 13 as a raw material, and a PAN fiber with a tensile strength of 9.3 cN/dtex was prepared by traditional wet spinning. The PAN fiber was pre-oxidized and carbonized to obtain a PAN-based carbon fiber with a tensile strength of 3.8 GPa and a tensile modulus of 281 GPa. In this example, the PAN in spinning stock solution had a mass concentration of 18%, and the other preparation conditions of the PAN fiber and PAN-based carbon fiber were the same as those in Example 2.

Example 14

31.91 parts of acrylonitrile, 0.33 parts of monomethyl itaconate, 0.66 parts of methyl acrylate, and 62 parts of dimethyl carbonate were stirred for 5 min under nitrogen protection at 160 r/min, to obtain a primary mixed raw material; under nitrogen protection, 0.64 parts of ammonium persulfate and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 15 h under the protection of nitrogen at 160 r/min, 65° C., and a relative pressure of 0 MPa (a conversion rate of a total mass of a polymerized monomer was 91%), to obtain a PAN suspension with a solid content of 29.12%; after removing the monomers, removing the solvent, washing and drying, a PAN powder was obtained, with a particle size of 150 nm to 230 nm, a number average molecular weight of PAN at $11.4 \times 10^4$ g/mol, a molecular weight distribution of 2.6, and an intrinsic viscosity of 2.86 dL/g (25° C., dimethylformamide).

Taking the PAN of Example 14 as a raw material, and a PAN fiber with a tensile strength of 8.3 cN/dtex was prepared by traditional wet spinning. The PAN fiber was pre-oxidized and carbonized to obtain a PAN-based carbon fiber with a tensile strength of 5.0 GPa and a tensile modulus of 298 GPa. In this example, the PAN in spinning stock solution had a mass concentration of 20%, and the other preparation conditions of the PAN fiber and PAN-based carbon fiber were the same as those in Example 2.

Example 15

31.89 parts of acrylonitrile, 0.33 parts of itaconic acid, 0.66 parts of methyl acrylate, and 62 parts of dimethyl carbonate were stirred for 5 min under nitrogen protection at 160 r/min, to obtain a primary mixed raw material; under nitrogen protection, 0.12 parts of azobisisobutyronitrile and 5 parts of ethyl methyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 18 h under the protection of nitrogen at 160 r/min, 65° C., and a relative pressure of 0 MPa (a conversion rate of a total mass of a polymerized monomer was 93%), to obtain a PAN suspension with a solid content of 29.76%; after removing the monomers, removing the solvent, washing and drying, a PAN powder was obtained, with a particle size of 140 nm to 210 nm, a number average molecular weight of PAN at $7.8 \times 10^4$ g/mol, a molecular weight distribution of 3.4, and an intrinsic viscosity of 1.92 dL/g (25° C., dimethylformamide).

Taking the PAN of Example 15 as a raw material, and a PAN fiber with a tensile strength of 8.7 cN/dtex was prepared by traditional wet spinning. The PAN fiber was pre-oxidized and carbonized to obtain a PAN-based carbon fiber with a tensile strength of 5.1 GPa and a tensile modulus of 311 GPa. In this example, the PAN in spinning stock solution had a mass concentration of 24%, and the other preparation conditions of the PAN fiber and PAN-based carbon fiber were the same as those in Example 2.

Example 16

29.61 parts of acrylonitrile, 0.3 parts of itaconic acid, 0 parts of methyl acrylate, 2 parts of ethanol, and 63 parts of dimethyl carbonate were stirred for 5 min under nitrogen protection at 160 r/min, to obtain a primary mixed raw material; under nitrogen protection, 0.09 parts of azobisisobutyronitrile and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 15 h under the protection of nitrogen at 160 r/min, 65° C., and a relative pressure of 0 MPa (a conversion rate of a total mass of a polymerized monomer was 90%), to obtain a PAN suspension with a solid content of 27%; after removing the monomers, removing the solvent, washing and drying, a PAN powder was obtained, with a particle size of 120 nm to 190 nm, a number average molecular weight of PAN at $12.1 \times 10^4$ g/mol, a molecular weight distribution of 2.5, and an intrinsic viscosity of 3.04 dL/g (25° C., dimethylformamide).

Taking the PAN of Example 16 as a raw material, and a PAN fiber with a tensile strength of 8.8 cN/dtex was prepared by traditional wet spinning. The PAN fiber was pre-oxidized and carbonized to obtain a PAN-based carbon fiber with a tensile strength of 5.8 GPa and a tensile modulus of 316 GPa. In this example, the PAN in spinning stock solution had a mass concentration of 21%, and the other preparation conditions of the PAN fiber and PAN-based carbon fiber were the same as those in Example 2.

Example 17

28.98 parts of acrylonitrile, 0.3 parts of itaconic acid, 0.6 parts of methyl acrylate, and 65 parts of dimethyl carbonate were stirred for 5 min under nitrogen protection at 160 r/min, to obtain a primary mixed raw material; under nitrogen protection, 0.12 parts of azobisisobutyronitrile and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 14 h under the protection of nitrogen at 160 r/min, 65° C., and a relative pressure of 0 MPa (a conversion rate of a total mass of a polymerized monomer was 90%), to obtain a PAN suspension with a solid content of 27%; after removing the monomers, removing the solvent, washing and drying, a PAN powder was obtained, with a particle size of 150 nm to 230 nm, a number average molecular weight of PAN at $13.3 \times 10^4$ g/mol, a molecular weight distribution of 2.4, and an intrinsic viscosity of 3.16 dL/g (25° C., dimethylformamide).

Taking the PAN of Example 17 as a raw material, and a PAN fiber with a tensile strength of 9.1 cN/dtex was prepared by traditional wet spinning. The PAN fiber was pre-oxidized and carbonized to obtain a PAN-based carbon fiber with a tensile strength of 5.2 GPa and a tensile modulus of 299 GPa. In this example, the PAN in spinning stock solution had a mass concentration of 19%, and the other preparation conditions of the PAN fiber and PAN-based carbon fiber were the same as those in Example 2.

Example 18

31.93 parts of acrylonitrile, 0.33 parts of ammonium itaconate, 0.66 parts of methyl acrylate, and 62 parts of dimethyl carbonate were stirred for 5 min under nitrogen protection at 160 r/min, to obtain a primary mixed raw material; under nitrogen protection, 0.08 parts of azobisisobutyronitrile and 5 parts of diethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 14 h under the protection of nitrogen at 160 r/min, 65° C., and a relative pressure of 0 MPa (a conversion rate of a total mass of a polymerized monomer was 85%), to obtain a PAN suspension with a solid content of 28%; after removing the monomers, removing the solvent, washing and drying, a PAN powder was obtained, with a particle size of 190 nm to 260 nm, a number average molecular weight of PAN at $8.8 \times 10^4$ g/mol, a molecular weight distribution of 2.8, and an intrinsic viscosity of 2.15 dL/g (25° C., dimethylformamide).

Taking the PAN of Example 18 as a raw material, and a PAN fiber with a tensile strength of 8.7 cN/dtex was prepared by traditional wet spinning. The PAN fiber was pre-oxidized and carbonized to obtain a PAN-based carbon fiber with a tensile strength of 4.9 GPa and a tensile modulus of 298 GPa. In this example, the PAN in spinning stock solution had a mass concentration of 22.5%, and the other preparation conditions of the PAN fiber and PAN-based carbon fiber were the same as those in Example 2.

Example 19

31.93 parts of acrylonitrile, 0.33 parts of methacrylic acid, 0.66 parts of acrylamide, and 62 parts of dimethyl carbonate were stirred for 5 min under nitrogen protection at 160 r/min, to obtain a primary mixed raw material; under nitrogen protection, 0.08 parts of azobisisobutyronitrile and 5 parts of diethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 14 h under the protection of nitrogen at 160 r/min, 65° C., and a relative pressure of 0 MPa (a conversion rate of a total mass of a polymerized monomer was 90%), to obtain a PAN suspension with a solid content of 29.7%; after removing the monomers, removing the solvent, washing and drying, a PAN powder was obtained, with a particle size of 150 nm to 270 nm, a number average molecular weight of PAN at $9.8 \times 10^4$ g/mol, a molecular weight distribution of 2.6, and an intrinsic viscosity of 2.45 dL/g (25° C., dimethylformamide).

Taking the PAN of Example 19 as a raw material, and a PAN fiber with a tensile strength of 9.3 cN/dtex was prepared by traditional wet spinning. The PAN fiber was pre-oxidized and carbonized to obtain a PAN-based carbon fiber with a tensile strength of 5.5 GPa and a tensile modulus of 309 GPa. In this example, the PAN in spinning stock solution had a mass concentration of 22.5%, and the other preparation conditions of the PAN fiber and PAN-based carbon fiber were the same as those in Example 2.

Example 20

31.93 parts of acrylonitrile, 0.33 parts of itaconic acid, 0.66 parts of vinyl acetate, and 62 parts of dimethyl carbonate were stirred for 5 min under nitrogen protection at 160 r/min, to obtain a primary mixed raw material; under nitrogen protection, 0.08 parts of azobisisobutyronitrile and 5 parts of diethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 15 h under the protection of nitrogen at 160 r/min, 65° C., and a relative pressure of 0 MPa (a conversion rate of a total mass of a polymerized monomer was 89%), to obtain a PAN suspension with a solid content of 29.4%; after removing the monomers, removing the solvent, washing and drying, a PAN powder was obtained, with a particle size of 180 nm to 260 nm, a number average molecular weight of PAN at $8.9 \times 10^4$ g/mol, a molecular weight distribution of 2.8, and an intrinsic viscosity of 2.25 dL/g (25° C., dimethylformamide).

Taking the PAN of Example 20 as a raw material, and a PAN fiber with a tensile strength of 8.7 cN/dtex was prepared by traditional wet spinning. The PAN fiber was pre-oxidized and carbonized to obtain a PAN-based carbon fiber with a tensile strength of 4.9 GPa and a tensile modulus of 300 GPa. In this example, the PAN in spinning stock solution had a mass concentration of 21%, and the other preparation conditions of the PAN fiber and PAN-based carbon fiber were the same as those in Example 2.

Example 21

34.21 parts of acrylonitrile, 0.35 parts of itaconic acid, 0.35 parts of isobutyl methacrylate, and 60 parts of dimethyl carbonate were stirred for 5 min under nitrogen protection at 160 r/min, to obtain a primary mixed raw material; under nitrogen protection, 0.09 parts of 2,2'-azobis-(2,4-dimethylvaleronitrile) and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 13 h under the protection of nitrogen at 160 r/min, 60° C., and a relative pressure of 0 MPa (a conversion rate of a total mass of a polymerized monomer was 88%), to obtain a PAN suspension with a solid content of 30.8%; after removing the monomers, removing the solvent, washing and drying, a PAN powder was obtained, with a particle size of 160 nm to 270 nm, a number average molecular weight of PAN at $18.1 \times 10^4$ g/mol, a molecular weight distribution of 2.9, and an intrinsic viscosity of 3.99 dL/g (25° C., dimethylformamide).

Taking the PAN of Example 21 as a raw material, and a PAN fiber with a tensile strength of 9.1 cN/dtex was prepared by dry jet wet spinning. The PAN fiber was pre-oxidized and carbonized to obtain a PAN-based carbon fiber with a tensile strength of 7.1 GPa and a tensile modulus of 309 GPa. In this example, the PAN in spinning stock solution had a mass concentration of 21%, and the other preparation conditions of the PAN fiber and PAN-based carbon fiber were the same as those in Example 2.

Example 22

33.77 parts of acrylonitrile, 0.35 parts of itaconic acid, 0.7 parts of methyl acrylate, 0.09 parts of dodecyl mercaptan, and 60 parts of dimethyl carbonate were stirred for 5 min under nitrogen protection at 160 r/min, to obtain a primary mixed raw material; under nitrogen protection, 0.09 parts of 2,2'-azobis-(2,4-dimethylvaleronitrile) and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 12 h under the protection of nitrogen at 160 r/min, 60° C., and a relative pressure of 0 MPa (a conversion rate of a total mass of a polymerized monomer was 86%), to obtain a PAN suspension with a solid content of 30.1%; after removing the monomers, removing the solvent, washing and drying, a PAN powder was obtained, with a particle size of 150 nm to 240 nm, a number average molecular weight of PAN at $10.3 \times 10^4$ g/mol, a molecular weight distribution of 2.6, and an intrinsic viscosity of 2.19 dL/g (25° C., dimethylformamide).

Taking the PAN of Example 22 as a raw material, and a PAN fiber with a tensile strength of 7.8 cN/dtex was prepared by traditional wet spinning. The PAN fiber was pre-oxidized and carbonized to obtain a PAN-based carbon fiber with a tensile strength of 5.5 GPa and a tensile modulus of 302 GPa. In this example, the PAN in spinning stock solution had a mass concentration of 20.5%, and the other preparation conditions of the PAN fiber and PAN-based carbon fiber were the same as those in Example 2.

Example 23

34.16 parts of acrylonitrile, 0.7 parts of monomethyl itaconate, 0.05 parts of dodecyl mercaptan, and 60 parts of dimethyl carbonate were stirred for 5 min under nitrogen protection at 160 r/min, to obtain a primary mixed raw material; under nitrogen protection, 0.09 parts of 2,2'-azobis-(2,4-dimethylvaleronitrile) and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 13 h under the protection of nitrogen at 160 r/min, 60° C., and a relative pressure of 0 MPa (a conversion rate of a total mass of a polymerized monomer was 85%), to obtain a PAN suspension with a solid content of 29.8%; after removing the monomers, removing the solvent, washing and drying, a PAN powder was obtained, with a particle size of 170 nm to 260 nm, a number average molecular weight of PAN at $11.3 \times 10^4$ g/mol, a molecular weight distribution of 2.8, and an intrinsic viscosity of 2.49 dL/g (25° C., dimethylformamide).

Taking the PAN of Example 23 as a raw material, and a PAN fiber with a tensile strength of 8.2 cN/dtex was prepared by traditional wet spinning. The PAN fiber was pre-oxidized and carbonized to obtain a PAN-based carbon fiber with a tensile strength of 5.8 GPa and a tensile modulus of 312 GPa. In this example, the PAN in spinning stock solution had a mass concentration of 21%, and the other preparation conditions of the PAN fiber and PAN-based carbon fiber were the same as those in Example 2.

Example 24

39.52 parts of acrylonitrile, 0.4 parts of itaconic acid, and 55 parts of dimethyl carbonate were stirred for 5 min under nitrogen protection at 160 r/min, to obtain a primary mixed raw material; under nitrogen protection, 0.04 parts of 2,2'-azobis-(2,4-dimethylvaleronitrile) and 5 parts of the dimethyl carbonate were mixed to obtain an initiator solution; and under nitrogen protection, the primary mixed raw material and the initiator solution were stirred at 160 r/min for 2 min to obtain a mixed raw material; and The mixed raw material was polymerized for 15 h under the protection of nitrogen at 160 r/min, 55° C., and a relative pressure of 0 MPa (a conversion rate of a total mass of a polymerized monomer was 85%), to obtain a PAN suspension with a solid content of 32.8%; after removing the monomers, removing the solvent, washing and drying, a PAN powder was obtained, with a particle size of 200 nm to 290 nm, a number average molecular weight of PAN at $49.8 \times 10^4$ g/mol, a molecular weight distribution of 3.1, and an intrinsic viscosity of 6.59 dL/g (25° C., dimethylformamide).

SEM observation was conducted on the PAN powder prepared in this example, and the results were shown in FIG. 1. As can be seen from FIG. 1, the PAN powder has a uniform particle size of 200 nm to 290 nm.

Example 25

The PAN powder obtained in Example 24 was pre-oxidized in air at 200° C., 230° C., 250° C., and 260° C. sequentially. Each temperature was held for 5 min, and an atmospheric pressure was normal pressure. A pre-oxidized PAN powder was sequentially subjected to low-temperature carbonization (at 450° C., 500° C., 550° C., 600° C., 650° C., 780° C., 800° C., and 900° C. in sequence in eight temperature zones, with a total residence time of 12 min) and high-temperature carbonization (at 1,100° C., 1,200° C., and 1,300° C. in sequence in three temperature zones, with a total residence time of 3 min), to obtain PAN-based carbon nanoparticles with a particle size of 140 nm to 230 nm.

Figure 2:
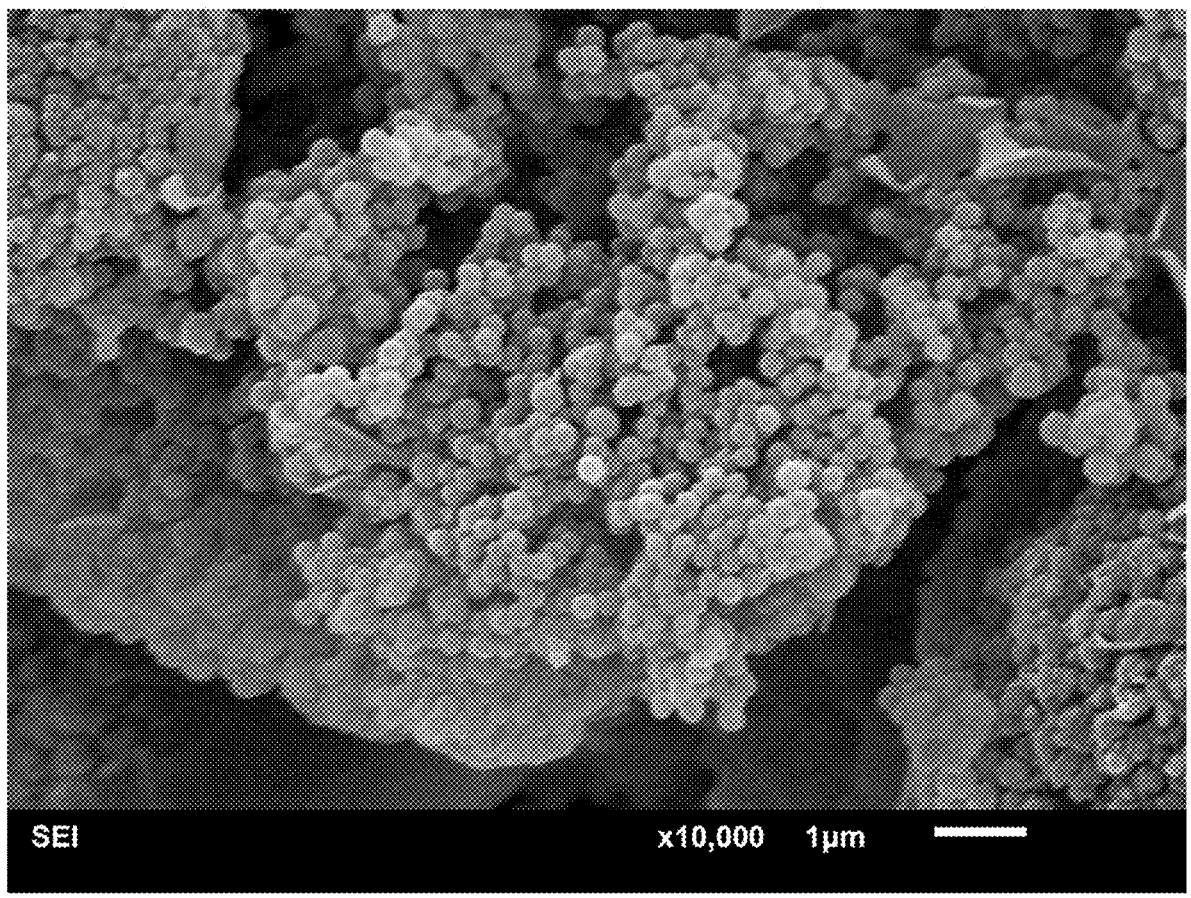
FIG. 2 shows a SEM image of PAN-based carbon nanoparticles prepared in Example 25.

SEM observation was conducted on the PAN-based carbon nanoparticles prepared in this example, and the results were shown in FIG. 2. As can be seen from FIG. 2, the PAN-based carbon nanoparticles have a uniform particle size of 140 nm to 230 nm.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

Various embodiments of the disclosure may have one or more of the following beneficial effects. In some embodiments, the disclosed preparation method and the prepared PAN may have a wide adjustable range of a PAN copolymerization composition, a low viscosity of a polymerization system, a high concentration of a polymerized monomer, a strong anti-scaling ability, and a desirable drying rate. The disclosed method and the prepared PAN may be beneficial to rapid and uniform dispersion of an additional polymerized monomer and transfer of heat in the polymerization during continuous polymerization. Tiny particles formed by a polymerization product are conducive to the long-term survival of an active radical chain, and may realize rapid polymerization to prepare PAN with a higher molecular weight. In some embodiments, the preparation method of PAN provided by the present disclosure is an efficient and low-cost method that is easy to realize continuous and large-scale production.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A method for preparing polyacrylonitrile (PAN), comprising the steps of:
mixing raw materials for polymerization to obtain a suspension comprising the PAN, the raw materials comprising following components by weight:

| | |
|---|---|
| an acrylonitrile monomer | 5 parts to 70 parts, |
| a first auxiliary monomer | 0 parts to 20 parts, |
| a second auxiliary monomer | 0.025 parts to 10 parts, |
| a polymerization medium | 20 parts to 90 parts, |
| an initiator | 0.001 parts to 4 parts, |
| a chain transfer agent | 0 parts to 5 parts, and |
| a settling agent | 0 parts to 30 parts; | and removing unreacted monomers and unreacted polymerization medium in the suspension to obtain the PAN; wherein:

the first auxiliary monomer is at least one item selected from the group consisting of a vinyl ester monomer, vinyl imidazole, 4-acryloyl morpholine, and styrene;
the second auxiliary monomer is at least one item selected from the group consisting of a vinyl acid monomer, a vinylamine monomer, a vinylamide monomer, and an ammonium salt of a vinyl acid; and
the polymerization medium is at least one item selected from the group consisting of dimethyl carbonate, diethyl carbonate, dibutyl carbonate, methyl hydrogen carbonate, ethyl methyl carbonate, propyl methyl carbonate, and butyl methyl carbonate.

2. The method according to claim 1, wherein the vinyl ester monomer is at least one item selected from the group consisting of methyl acrylate, methyl methacrylate, vinyl acetate, propylene acetate, allyl acetate, ethyl acrylate, ethyl methacrylate, 2-ethylhexyl methacrylate, 2-hydroxyethyl methacrylate, 2-hydroxypropyl methacrylate, cyclohexyl methacrylate, isobutyl acrylate, n-butyl acrylate, n-butyl methacrylate, isobutyl methacrylate, dimethyl maleate, dimethyl itaconate, monomethyl itaconate, monoethyl itaconate, mono-n-propyl itaconate, monoisopropyl itaconate, mono-n-butyl itaconate, mono-isobutyl itaconate, ethyl 2-(dimethylamino) acrylate, and propyl 3-(dimethylamino) acrylate.

3. The method according to claim 1, wherein:
the vinyl acid monomer is at least one item selected from the group consisting of acrylic acid, methacrylic acid, itaconic acid, methylfumaric acid, 2-butenoic acid, maleic acid, methylmaleic acid, 2-acrylamido-2-methylpropanesulfonic acid, and methylallylsulfonic acid;
the vinylamine monomer is at least one item selected from the group consisting of dimethylamino ethyl methacrylate, 2-ethylamino ethyl methacrylate, and N,N-dimethylallylamine;
the vinylamide monomer is at least one item selected from the group consisting of acrylamide, methacrylamide, N-hydroxymethyl acrylamide, N,N-dimethylacrylamide, amine methylallyl sulfonate, and amine styrene sulfonate; and
the ammonium salt of the vinyl acid comprises ammonium itaconate.

4. The method according to claim 1, wherein:
the initiator is at least one item selected from the group consisting of an azo initiator and a peroxy initiator;
the azo initiator is at least one item selected from the group consisting of azobisisobutyronitrile, 2,2'-azodi(2-methylbutyronitrile), 2,2'-azobis-(2,4-dimethylvaleronitrile), dimethyl 2,2'-azobis(2-methylpropionate), 2,2'-azobis[2-methylpropionamidine] dihydrochloride, 2,2'-azobis[2-(2-imidazolin-2-yl)propane] dihydrochloride, 4,4'-azobis(4-cyanovaleric acid), 2,2'-[azobis(1-methylethylidene)]bis[4,5-dihydro-1H-imidazole], and 2,2'-azobis[2-methyl-N-(2-hydroxyethyl)propionamide]; and
the peroxy initiator is at least one item selected from the group consisting of hydrogen peroxide, benzoyl peroxide, dodecanoyl peroxide, cumene hydroperoxide, tert-butyl hydroperoxide, diisopropyl peroxydicarbonate, ammonium persulfate, and potassium persulfate.

5. The method according to claim 1, wherein the settling agent is at least one item selected from the group consisting of water, ethanol, methanol, pentanol, n-butanol, isobutanol, cyclohexanol, benzyl alcohol, ethylene glycol, glycerol, chloroform, formic acid, and acetic acid.

6. The method according to claim 1, wherein the polymerization is conducted at 30° C. to 100° C.

7. The method according to claim 6, wherein the polymerization is conducted for 0.5 h to 24 h.

8. The method according to claim 1, wherein the polymerization is conducted under a protective atmosphere.

* * * * *